United States Patent [19]

Seroo et al.

[11] Patent Number: 4,954,028
[45] Date of Patent: Sep. 4, 1990

[54] PROCESS FOR MAKING, FINISHING CROWN WHEELS

[75] Inventors: Jan M. Seroo, Bochelt, Belgium; Martinus H. Cuypers, Eindhoven; Anthonius J. H. M. Oude Maatman, Oldenzaal, both of Netherlands

[73] Assignee: Hankamp B.V., Netherlands

[21] Appl. No.: 314,543

[22] Filed: Feb. 23, 1989

[30] Foreign Application Priority Data

Feb. 24, 1988 [NL] Netherlands ............ 8800472

[51] Int. Cl.$^5$ .................. B23F 23/10; B23F 5/08
[52] U.S. Cl. ............................ 409/26; 51/287; 409/41; 409/51
[58] Field of Search ............ 409/9, 25, 26, 30, 31, 409/33, 34, 38, 39, 41, 48, 50, 51; 51/287, 52 R, 56 G

[56] References Cited

U.S. PATENT DOCUMENTS

| 2,304,586 | 12/1942 | Miller | 407/23 |
|---|---|---|---|
| 2,665,612 | 1/1954 | Nubling | 409/41 |
| 3,091,059 | 5/1963 | Cleff | 51/32 |
| 4,058,938 | 11/1977 | Härle et al. | 51/287 |
| 4,714,387 | 12/1987 | Ohno | 409/51 |
| 4,811,528 | 3/1989 | Sommer | 51/287 |

FOREIGN PATENT DOCUMENTS

| 2630406 | 2/1977 | Fed. Rep. of Germany | 409/38 |
|---|---|---|---|
| 2934345 | 9/1980 | Fed. Rep. of Germany | 409/38 |
| 3228296 | 2/1984 | Fed. Rep. of Germany | 409/25 |
| 158621 | 1/1983 | German Democratic Rep. | 409/41 |
| 611739 | 5/1978 | U.S.S.R. | 409/31 |
| 1323264 | 7/1987 | U.S.S.R. | 409/48 |
| 1219081 | 1/1971 | United Kingdom . | |

*Primary Examiner*—William Briggs
*Attorney, Agent, or Firm*—Ostrolenk, Faber, Gerb & Soffen

[57] ABSTRACT

A process for the making and/or finishing of a crown wheel using a metal-cutting tool, the crown wheel being intended for meshing with a predetermined cylindrical gear. The metal-cutting tool is a rotary disc-type element whose working transverse section lying in the plane of the axis of rotation corresponds essentially to the tooth profile of the cylindrical gear. The disc-type element is placed in such a way relative to the crown wheel to be made that the tooth profile of the element coincides with the tooth profile of the cylindrical gear when it is engaged with the crown wheel. The disc-type element is put into a to and fro linear motion perpendicular to its axis of rotation and is at the same time tilted about an axis which coincides with the axis of rotation of the cylindrical gear when it is engaged with the crown wheel. The tooth profile of the element meshes with the crown wheel to be made and finishes the tooth flanks according to the generating principle.

12 Claims, 2 Drawing Sheets

PROCESS FOR MAKING, FINISHING CROWN WHEELS

BACKGROUND OF THE INVENTION

The invention relates to a process for the making and/or finishing of a crown wheel using a metal-cutting tool, said crown wheel being intended for mating with a predetermined cylindrical gear.

Various methods are known so far for the making of crown wheels. The first one which can be mentioned is a generating process, which can be carried out on known gear cutting machines which are provided with additional "right-angled" attachments. This method does, however, have limits as regards the dimensions of the crown wheels to be produced and the required accuracy. If very high-grade crown wheels have to be produced, these crown wheels have to undergo a hardening treatment and a finishing operation.

Another method is "spark erosion", as described, for example, in EP-A-0077097. This method has the disadvantage that spark erosion is a very time-consuming process. Besides, the spark erosion process affects the material properties of the toothing surface, so that in this case also a finishing operation is required for crown wheels where very strict standards have to be met.

The object of the present invention is then to produce a process with which roughly shaped crown wheels can be finished, said process also being suitable for producing the crown wheel.

DESCRIPTION OF THE INVENTION

This object is achieved according to the invention in that the metal-cutting tool is a rotary disc-type element whose working transverse section lying in the plane of the axis of rotation corresponds essentially to the tooth profile of the cylindrical gear;

the disc-type element is placed in such a way relative to the crown wheel to be made and/or finished that the tooth profile of the said element coincides essentially to the tooth profile of the cylindrical gear when it is engaged with the crown wheel;

the disc-type element is put into a to and fro linear motion perpendicular to its axis of rotation in the direction of the tooth space of the crown wheel engaged with the element;

the disc-type element is tilted about an axis which is perpendicular to the axis of rotation thereof and runs in the linear motion direction, and which coincides with the axis of rotation of the cylindrical gear when it is engaged and mating with the crown wheel, and the crown wheel carries out a rotation corresponding with this about its own axis of rotation, in such a way that the ratio of the angular speeds of the rotation of the crown wheel and the tilting movement of the disc-type element is the same as the transmission ratio between the crown wheel and the cylindrical gear, and the tooth profile of the disc-type element runs over the toothing of the crown wheel;

the disc-type element is withdrawn from the toothing of the crown wheel and the crown wheel is rotated over a particular angle for machining a subsequent part of the crown wheel.

Since the tool used is a rotating disc-type element whose tooth-shaped profile carries out a generating movement of a tooth of the cylindrical gear mating with the crown wheel, while at the same time the element makes a to and fro feed movement, accurate machining of the tooth flanks of the tooth space in question is obtained.

Since each crown wheel can mate with only one specific gear as regards shape and dimensions, the tilting axis is unambiguously determined for each crown wheel to be machined or produced.

The tool here can be a grinding disc or a profile cutter, depending on whether it is a finishing or a making process.

It is pointed out that a profile cutter is known per se in the making of gears. The profile of the cutter in this known method is, however, formed according to the tooth space of the toothing to be produced, while according to the invention a generating process in which a cutting tool has a tooth profile is proposed.

The use of a generating process with a tooth-shaped cutting profile is known per se from the state of the art. Such a known hobbing cutter is, however, a cylindrical element which is formed as a single-threaded worm provided with cutting edges, the worm making both a rotation about its own axis of rotation and a to and fro feed movement.

The wear of the disc-type element is preferably measured during the finishing operation, and the position of the axis of rotation is corrected on the basis of the measured value.

DESCRIPTION OF THE PREFERRED EMBODIMENT

The invention is explained in greater detail with reference to the drawing, in which.

Figure 1:
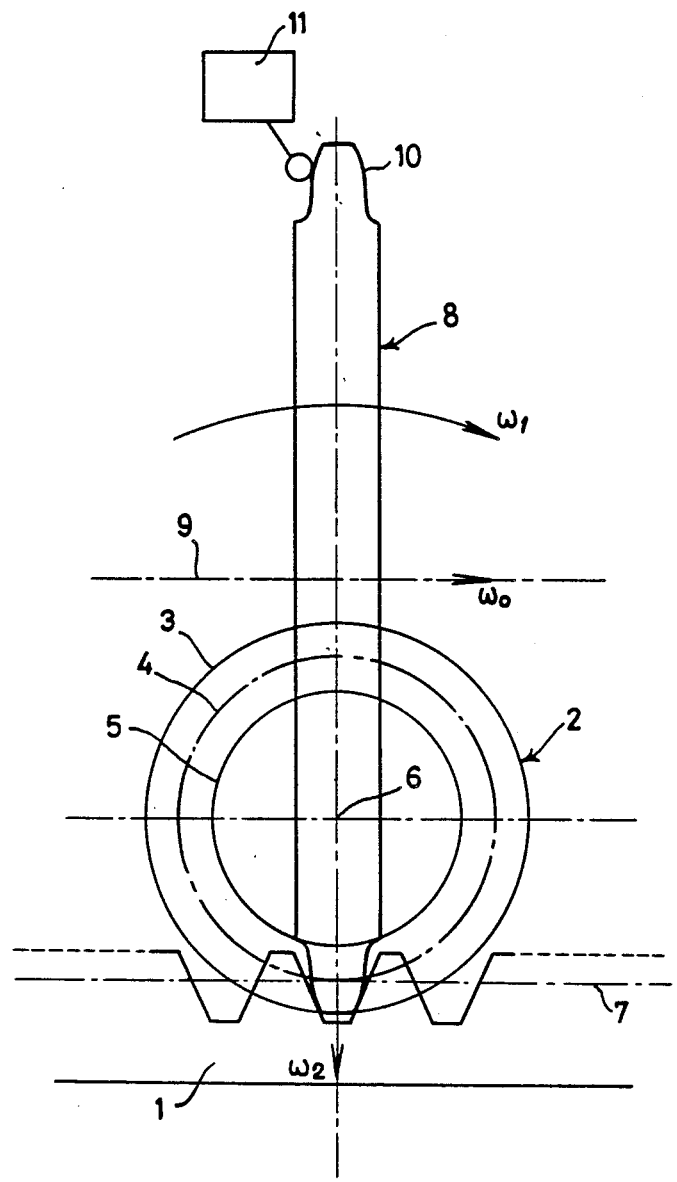
FIG. 1 shows schematically the process of the invention.

FIG. 1 shows part of a crown wheel 1, which is intended for mating with a cylindrical gear 2, of which only the tip circle 3, the pitch circle 4 and the root circle 5 are shown. The cylindrical gear 2 or pinion rotates about an axis of rotation 6 which is at right angles to the plane of the drawing, the pitch circle 4 running true over the pitch circle 7 of the crown wheel 1.

The pinion 2 is shown in FIG. 1 for illustration purposes and is in fact not present. The pinion 2 in the drawing serves only to indicate the position and setting of the axis of rotation 6. As will be explained below in greater detail, this axis of rotation 6 of the pinion plays an important role in the process according to the invention.

For grinding of the teeth of the crown wheel 1 provision is made for a grinding disc 8, which is at right angles to the plane of the drawing and can rotate at high angular speed $W_0$ about its axis 9. The grinding disc 8 has on the outer periphery, viewed in a transverse section running through the axis of rotation 9, a tooth profile 10 corresponding to the tooth profile of the pinion 2. As can be seen in FIG. 1, the grinding disc 8 is placed in such a way with its tooth profile 10 in a tooth space of the toothing of the crown wheel 1 that the tooth profile 10 of the grinding disc would coincide with the tooth profile of a tooth of the pinion 2 engaging in the same tooth space if said pinion 2 were engaged with the crown wheel 1. Since the grinding disc is a metal removing tool, the tooth profile will in practice not coincide accurately with the tooth profile of the pinion, but the usual corrections will be made at the head and foot of the tooth profile of the grinding disc.

The crown wheel is now ground in the following manner:

The rotating grinding disc 8 has a to and fro linear feed movement which is at right angles to the plane of the drawing, parallel to the pinion axis 6. During this movement part of the two tooth flanks of the tooth space in question which are in contact with the grinding disc is ground. When the grinding wheel has been to and fro through the particular tooth space, the grinding disc 8 is tilted slightly about the axis 6 in the direction of the arrow $W_1$.

At the same time the crown wheel is rotated slightly at an angular speed $W_2$. The ratio between the angular speeds $W_1$ and $W_2$ corresponds to the transmission ratio between the pinion 2 and the crown wheel 1. The grinding disc 8 is moved again in this position through the tooth space in question, and a subsequent part of the tooth flanks bounding the tooth space is then worked.

If the grinding disc 8 is tilted about the axis 6 and the crown wheel is rotated at the same time, the tooth profile 10 of the grinding disc 8 runs over the two tooth flanks of the tooth space in question, in the same way as the toothing of the pinion 2 would run. The two tooth flanks of the crown wheel 1 are ground by making a to and fro feed movement in addition. When the grinding disc has moved once or more over the tooth flanks of the tooth space, the grinding stone is withdrawn from the tooth space, following which the crown wheel is rotated over one pitch and the grinding disc is placed in the next tooth space in order to work it.

Although the process according to the invention is described here for finish-grinding of rough-made crown wheels which have been made by, for example, forging, cutting or spark erosion, it will be clear to the expert that, by using a profile cutter instead of a grinding disc, with this process it is also possible to make a crown wheel which can be ground again by the same process.

A so-called dressing device 11 can be provided at the side opposite the side of the grinding disc engaging with the crown wheel. Such a dressing device is used to correct the tooth profile of the grinding disc if said profile shows deviations as a result of wear. The dressing device here grinds part of the outer periphery of the grinding stone, so that the diameter thereof decreases. In order to ensure that the tooth profile of the grinding disc always takes up the correct position relative to the crown wheel toothing, provision is also made for an adjustment device (not shown in the drawing) which works in concert with the dressing device and which moves the position of the axis of rotation 9 of the grinding disc according to the reduction of the diameter of the grinding disc caused by the dressing device. If a grinding disc with diamond powder or another abrasive grain which is not subsequently dressable is used, then the dressing device and the adjustment device are unnecessary.

Although FIG. 1 shows a grinding disc 8 whose tooth profile has only a single tooth, it would also be possible to use a tooth profile with two or more teeth. This has the advantage that the tool is in contact with the workpiece at several points, so that the machining speed is increased.

Figure 2:
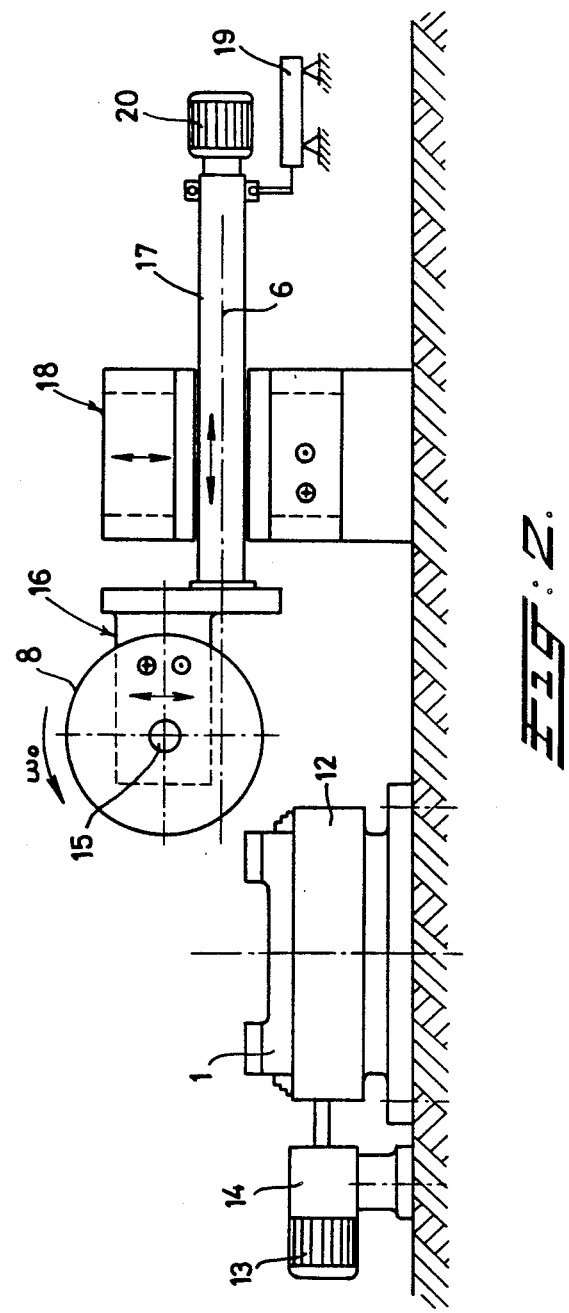
FIG. 2 shows a schematic view of a device for carrying out the process of FIG. 1.

FIG. 2 shows schematically a device for carrying out the process. In this figure the different parts are indicated as far as possible by the same reference numbers as those in FIG. 1.

FIG. 2 shows the crown wheel 1 to be machined, clamped on a horizontal, accurate, play-free dividing head 12. This dividing head is rotatably driven by means of a stepping motor 13 which is coupled to a play-free gearbox 14.

The rotary grinding disc 8 is rotatably mounted on a shaft 15 which is mounted in a yoke 16 in such a way that it is vertically adjustable. This height adjustment is important for the adjustment of the grinding disc after dressing of the grinding profile. The grinding disc is also adjustable vertical to the plane of the drawing, in order to permit proper positioning of the grinding disc relative to the crown wheel.

The yoke 16 is supported by means of a shaft 17 in a frame 18, in such a way that the yoke with the grinding disc can tilt about the axis 6 of the shaft 17. The shaft 17 is adjustable in the frame 18 both vertically and in the direction at right angles to the plane of the drawing, so that the position of the tilting axis 6 can be accurately set.

The shaft 17 is also mounted so that it can slide in the lengthwise direction in the frame 18 in order to produce the linear feed movement of the grinding disc. This linear movement can be obtained by any suitable drive, such as, for example, a piston/cylinder assembly 19.

Finally, a stepping motor 20 is connected to the shaft 17. With this motor the shaft can carry out a rotation about its own axis 6, said rotation causing the tilting movement of the grinding disc 8. By synchronizing the rotations of the two stepping motors 13 and 20 with each other in such a way that the ratio of their angular speeds is the same as the transmission ratio between the crown wheel and the cylindrical gear intended for mating with the crown wheel, an accurate generating movement of the tooth profile of the grinding disc over the toothing of the crown wheel is obtained.

The rotation of the crown wheel and the tilting movement of the tool can, of course, also be coupled in a mechanical manner, instead of by means of the stepping motors 13 and 20.

What is claimed is:

1. A method of using a disc-type element to make and/or finish a crown wheel, said crown wheel being intended for mating and meshing with a predetermined cylindrical gear, said disc-type element being rotatable about a first axis of rotation, said disc-type element having a peripheral working section, the cross-sectional profile of said working section of said disc-type element corresponding substantially to the tooth profile of the cylindrical gear, the diameter of said disc-type element being considerably larger than the diameter of the cylindrical gear, the method comprising the steps of:

positioning said disc-type element relative to said crown wheel such that said working section of said disc-type element is disposed in a position to work a longitudinal tooth space of said crown wheel;

working said tooth space by rotating said disc-type element about said first axis;

tilting said disc-type element about a second axis of rotation, said second axis being perpendicular to said first axis and parallel to said longitudinal tooth space, said second axis coinciding with the axis of rotation of the cylindrical gear;

rotating said crown wheel during the step of tilting said disc-type element such that the ratio of the angular velocity of said tilting of said disc-type element to the angular velocity of said rotating of said crown wheel equals the transmission ratio between the cylindrical gear and said crown wheel.

2. The method of claim 1, further comprising the steps of: (a) measuring the wear on said disc-type element and (b) correcting the position of said disc-type element on the basis of said measured wear.

3. The method of claim 1, further comprising the step of repositioning said disc-type element relative to said crown wheel such that said working section of said disc-type element is in position to work another tooth space of said crown wheel.

4. The method of claim 3, wherein said step of repositioning said disc-type element comprises the steps of: (a) withdrawing said disc-type element from said crown wheel; (b) rotating said crown wheel; and (c) reinserting said disk-type element adjacent said crown wheel such that said working section of said crown wheel is disposed in a position to work said another tooth space of said crown wheel.

5. The method of claim 4, further comprising the step of moving said disc-type element in a linear direction, said linear direction being perpendicular to said first axis and parallel to said longitudinal tooth space.

6. The method of claim 5, wherein said step of moving said disc-type element in a linear direction includes moving said disc-type element back and forth in said linear direction.

7. The method of claim 6, further comprising the steps of: (a) measuring the wear on said disc-type element and (b) correcting the position of said disc-type element on the basis of said measured wear.

8. The method of claim 6, wherein said crown wheel is made of metal.

9. The method of claim 8, wherein said disc-type element is a grinding disc.

10. The method of claim 8, wherein said disc-type element is a profile cutter.

11. A method of working a crown wheel, the method comprising the steps of:
(A) positioning a peripheral working section of a disc-type element within a tooth space of said crown wheel;
(B) rotating said disc-type element about a first axis of rotation, said first axis of rotation extending through the center of said disc-type element; and
(C) meshing said peripheral working section of said disc-type element with said tooth space of said crown wheel by:
  (a) tilting said disc-type element about a second axis, said second axis being perpendicular to said first axis, said second axis being between said first axis and said tooth space; and
  (b) rotating said crown wheel during said tilting of said disc-type elements.

12. A system for working a crown wheel, the system comprising:
(A) a disc-type element with a peripheral working section, the peripheral working section of said disc-type element being positionable within a tooth space of the crown wheel;
(B) means for rotating said disc-type element about a first axis of rotation, said first axis of rotation extending through the center of said disc-type element; and
(C) means for meshing said peripheral working section of said disc-type element with the tooth space of the crown wheel, said means for meshing said peripheral working section with the tooth space including:
  (a) means for tilting said disc-type element about a second axis, said second axis being perpendicular to said first axis, said second axis being between said first axis and the tooth space; and
  (b) means for rotating the crown wheel during the tilting of said disc-type element.

* * * * *